(12) United States Patent
Mogi et al.

(10) Patent No.: US 7,136,862 B2
(45) Date of Patent: Nov. 14, 2006

(54) METHOD FOR CREATION AND MANAGEMENT OF VIRTUAL VOLUMES FOR DBMS

(75) Inventors: Kazuhiko Mogi, Yokohama (JP); Hideomi Idei, Yokohama (JP); Norifumi Nishikawa, Machida (JP); Toyohiro Nomoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 10/387,284

(22) Filed: Mar. 11, 2003

(65) Prior Publication Data
US 2004/0054648 A1 Mar. 18, 2004

(30) Foreign Application Priority Data
Sep. 17, 2002 (JP) ............... 2002-269372

(51) Int. Cl.
*G06F 17/30* (2006.01)
(52) U.S. Cl. .............. 707/101; 707/200; 707/204; 707/205
(58) Field of Classification Search ................ 707/100, 707/200
See application file for complete search history.

(56) References Cited

U.S. PATENT DOCUMENTS

| | | | | |
|---|---|---|---|---|
| 5,129,088 A | * | 7/1992 | Auslander et al. | 711/1 |
| 5,802,599 A | * | 9/1998 | Cabrera et al. | 711/170 |
| 5,897,661 A | * | 4/1999 | Baranovsky et al. | 707/205 |
| 6,199,141 B1 | | 3/2001 | Weinreb et al. | |
| 6,633,916 B1 | | 10/2003 | Kauffman et al. | |
| 6,678,715 B1 | * | 1/2004 | Ando | 718/105 |
| 6,691,121 B1 | | 2/2004 | Heronimus et al. | |
| 2002/0019908 A1 | * | 2/2002 | Reuter et al. | 711/112 |
| 2003/0093439 A1 | | 5/2003 | Mogi et al. | |
| 2003/0208493 A1 | | 11/2003 | Hall et al. | |

OTHER PUBLICATIONS

Marc Farley, *Building Storege Networks* (second ed.), Osborne/McGraw-Hill (2001), pp. 88-90, 515-516.
*Oracls 9I Database Administrator's Guide*, Oracle (Jun. 2001), Release 1 (9.0.1), Part No. A90117.01, Chapter 3, "Using Oracle-Managed Files," pp. 3-1 through 3-28.

* cited by examiner

*Primary Examiner*—Jean M. Corrielus
(74) *Attorney, Agent, or Firm*—Townsend and Townsend and Crew LLP

(57) ABSTRACT

There is a strong demand for facilitation of management of storage region for DB data is required in a computer system combining an apparatus having the DBMS and virtualization function and software. In order to realize such requirement, the requirements for system management regarding a newly created DB and the information about the function to be set for the DB data are given to a system management server. The system management server detects a data structure of DB from such information and sends independently instructions to virtualization apparatuses to create virtual volumes or the like to which the data of each data structure is stored separately and set the function to the virtual volume as required. Thereafter, the system management server also issues an instruction to the DBMS to create a DB to store the data of data structure to the corresponding virtual volume.

38 Claims, 10 Drawing Sheets

FIG. 3

302 MAPPING INFORMATION

| UPPER VIRTUAL STRUCTURE IDENTIFIER (312) | BLOCK NUMBER IN UPPER STRUCTURE (314) | LOWER VIRTUALIZATION FUNCTION IDENTIFIER (316) | LOWER MANAGEMENT STRUCTURE IDENTIFIER (318) | BLOCK NUMBER IN LOWER STRUCTURE (320) |
|---|---|---|---|---|
| Upper 0 | 0-10239 | LowApp0 | Lower0 | 0-10239 |
|  | 10240-20479 | LowApp1 | Lower1 | 0-10239 |
| Upper 1 | 0-10239 | LowApp0 | Lower0 | 10240-20479 |
|  | 10240-20479 | LowApp1 | Lower1 | 10240-20479 |
| ⋮ | ⋮ | ⋮ | ⋮ | ⋮ |
| "Free" (322) | — | LowApp0 | Lower0 | 10240-20479 |
| ⋮ | ⋮ | ⋮ | ⋮ | ⋮ |

304 FUNCTION SETTING INFORMATION

| UPPER VIRTUAL STRUCTURE IDENTIFIER (312) | SETTING FUNCTION (334) | DETAILS OF FUNCTION SETTING (336) |
|---|---|---|
| Upper 0 | Snapshot | GENERATED IN THE UPPER SS0 |
|  | Remote Copy | COPIED (MIRRORED) TO SYNCHRONOUS GROUP 0, MEMORY A-2 UPPER RC1 |
| Upper 2 | Snapshot | GENERATED TO UPPER SS2, SYNCHRONOUS TO UPPER 7 |
| ⋮ | ⋮ | ⋮ |

306 DB STRUCTURE INFORMATION

| DB IDENTIFIER (342) | DATA STRUCTURE IDENTIFIER (344) | CLASS OF STRUCTURE (346) | CORRESPONDING UPPER VIRTUAL DATA STRUCTURE (348) |
|---|---|---|---|
| DB1 | Tbl-A | Table | Upper3, Upper4 |
| DB1 | Ind-A1 | B-Tree Index | Upper5 |
| ⋮ | ⋮ | ⋮ | ⋮ |

MANAGEMENT INFORMATION

FIG. 9

STRUCTURE DEFINITION INFORMATION

| DB STRUCTURE IDENTIFIER (344) | DATA STRUCTURE DEFINITION INFORMATION (422) | GROUP IDENTIFIER (432) |
|---|---|---|
| Tbl A | Table, ··· | Grp 1 |
| Ind A-1 | B-Tree Index on Tbl A, ··· | Grp 2 |
| Tbl B | Table, ··· | Grp 1 |
| ⋮ | ⋮ | ⋮ |

STORAGE MANAGEMENT GROUP INFORMATION

| GROUP IDENTIFIER (432) | FUNCTION SETTING REQUIREMENT (424) | REGION FEATURE REQUEST (426) | INITIAL CAPACITY (428) | INCREMENT OF CAPACITY (430) |
|---|---|---|---|---|
| Grp 1 | SS (1), RC | PERFORMANCE: HIGH, RAID1 | 200MB | 10MB |
| Grp 2 | SS (2) | PERFORMANCE: HIGH | 50MB | 2MB |
| | | | | |
| ⋮ | ⋮ | ⋮ | ⋮ | ⋮ |

STRUCTURE SETTING INFORMATION

METHOD FOR CREATION AND MANAGEMENT OF VIRTUAL VOLUMES FOR DBMS

FIELD OF THE INVENTION

The present invention relates to a computer system which has combined apparatuses and software having a function to provide a database management system and a virtual memory region to computers and computers in which database management systems operate.

BACKGROUND OF THE INVENTION

With increase in amount of data used and accumulated in a computer system, storage capacity of a storage unit included in the computer system increases. In order to save the cost of instruction, maintenance and management cost of the storage unit having larger capacity, the storage unit has been centralized by utilizing a SAN (Storage Area Network) which is an exclusive network for storage. Moreover, various techniques for the SAN have been introduced (for example, refer to Marc Farley, "Building Storage Networks, Second Edition", Osborne/McGraw-Hill, 2001, pp. 86–90, pp. 515–516.).

Marc Farley's reference describes, in its pages 86 to 90, the technique referred to as "virtualization". With this technique, virtual storage units are created in place of a physical storage unit to store data and provided to the computer and application programs to be executed by this computer. In this reference, it is also described that virtualization may be realized in many layers and the virtualization consists of several functions such as a function to summarize a plurality of physical storage units into a virtual memory region and a function to divide a physical storage unit into a plurality of virtual storage regions.

This Marc Farley's reference also describes, in its pages 515 to 516, the technique to employ an access model which is different from that in the prior art and which is referred to as the "Object-Based Storage(OBS)". With the hard disk drive of the prior art, a computer calculates a logical block address and designates a memory region for access using such calculated logical block address. Meanwhile, in the OBS, an access destination (address) is designated using storage location information required for calculation of memory region of storage unit in which data is stored. Accordingly, calculation cost of logical block address in computers can be saved.

As another design goal of OBS, realization of storage unit holding the self-management function may be listed. The OBS realizes the storage unit with the data management function for the local region of storage unit by utilizing file system attribute or the like. As an example of this data management function, error correction, memory region management, backup, mirror and data migration may be listed.

When application software to be executed on the computer system using a SAN is considered, many application softwares use the data stored in a database (DB) as the basic data and therefore a database management system (DBMS) which is software to perform a series of processes and management in regard to DB is extremely important.

Here, a function to facilitate management of data storage region in the DBMS is known (for example, refer to "Oracle9i Database Administrator's Guide Release 1 (9.0.1)", Oracle, Part No. A90117-01, 2001, Chapter 3 Using Oracle-Managed Files.). The Oracle's Guide describes the automatic management function of data storage region referred to as Oracle-Managed Files (OMF). In the OMF, it is assumed that data is stored in a data file created by utilizing the standard file system interface. When a storage region is newly required for every predetermined external storage region management structure (such as tablespace) the data file storing data is automatically expanded and a new data file is generated. Moreover, the data files which are no longer required are deleted adequately.

SUMMARY OF THE INVENTION

At present, it is not a rare case that the remote mirroring function and snapshot mirror function by a storage unit or a virtualization device is set for a memory region to store DB data in view of realizing higher reliability or reducing performance drawback effect of backup process. Setting of these functions is performed considering a data structure of DB such as table, index and log. Accordingly, in regard to the memory region to hold the particular data structure, it is necessary to perform the management for always setting these functions.

In the virtualization and OBS described in the Marc Farley reference, an information transfer function is not particularly determined for the contents of stored data. Therefore, only expansion of memory region already determined can be realized only with the technique described above in regard to automatic management of memory region including management of functions in the storage unit. Accordingly, an administrator has to execute management of memory region such as new assignment of region.

In the OMF described in the Oracle9i reference, it is impossible to perform directly the management of various functions provided by the storage unit because the standard file system interface is utilized. Namely, an administrator has to configure the system so that data is stored onto the region where the necessary functions are set.

As described above, an administrator can participate in various portions for management of memory regions under the present condition. However, it is preferable as much as possible to attain automatic management from the viewpoint of elimination of human error and saving of management cost or the like.

An object of the present invention is to provide a method for remarkably widening the range of automatic memory region management process for DB data and also facilitating this process in a computer system combining an apparatus having the virtualization function with DBMS or the software for this function with DBMS.

Another object of the present invention is to provide a frame structure which can optimize data allocation and cache control or the like within the storage unit with reference to the information obtained to realize automatic memory region management.

The present invention provides following means to achieve the objects described above.

First, the requirements for system management, such as an upper limit in size of region which may be available in a newly created DB and setting of destination in mirroring for use of remote mirroring function among remote sites, are given to system management servers. Subsequently, a schema of newly created DB is given to the system management servers. Here, an instruction is issued to an apparatus having the virtualization function and to software to create virtual volumes or the like to which the data of each data structure is stored separately by detecting data structure of DB from the given schema. Thereafter, an instruction is also issued to the DBMS to create a new DB to store the virtual volume or the like corresponding to data of data structure.

As a rule, a virtual volume or the like holds the data of data structure. However, a plurality of data structures may also be processed as a group, considering restriction or the like for setting of functions of storage units. In this case, data storage regions are assigned to the DBMS so that a plurality of data structures can be stored in the same virtual volume or the like.

Information about functions to be used for DB data such as a remote mirroring function and snapshot mirror function is given together with the schema of DB and this information is managed with a system management server. The virtual volumes or the like storing the data which requires particular functions are created onto the storage units having the required functions. After a virtual volumes or the like are created based on the information about functions, the necessary functions are set to the created virtual volumes or the like.

A data storage region can be expanded as described below. A DBMS or an administrator issues first, with a certain manner, a request for expansion of region to store data of a certain data structure. The system management server detects the expansion request, acquires conditions of region for storing data structure of expansion request and issues an instruction for expansion of existing virtual volume or the like or creation of a new virtual volume or the like by utilizing the region which satisfies the conditions, makes the DBMS to recognize and use the created volume.

For deletion of the data storage region, the system management server issues, when the DB is deleted, an instruction for deletion of virtual volume or the like which is holding the data of deleted DB as the object of deletion.

The system management server has already detected mapping information about data structure and gives this information to each apparatus having the virtualization function. These apparatuses optimize prefetch of data onto the cache and allocation of data by utilizing this information.

BRIEF DESCRIPTION OF DRAWINGS

FIG. 3 illustrates a data structure of management information 10b.

FIG. 9 illustrates a data structure of structure setting information 420b.

DESCRIPTION OF THE PREFERRED EMBODIMENTS

The preferred embodiments of the present invention will be described below. The present invention is never restricted by these embodiments.

<First Embodiment>

In a first embodiment, for every data structure of DB such as table, index, and log virtual volumes are assigned separately based on the schema of designed DB in the apparatus having the virtualization function and software. An instruction is issued to the DBMS to create a DB in order to store such data to the corresponding virtual volume or the like and thereby the particular virtual volume or the like holds the only the data belonging to the particular data structure is stored to the particular virtual volume. Accordingly, assigned to the data structure of the DB the functions such as snapshot mirror and remote mirroring can be automatically to the virtual volumes created by the instruction described above.

Figure 1:
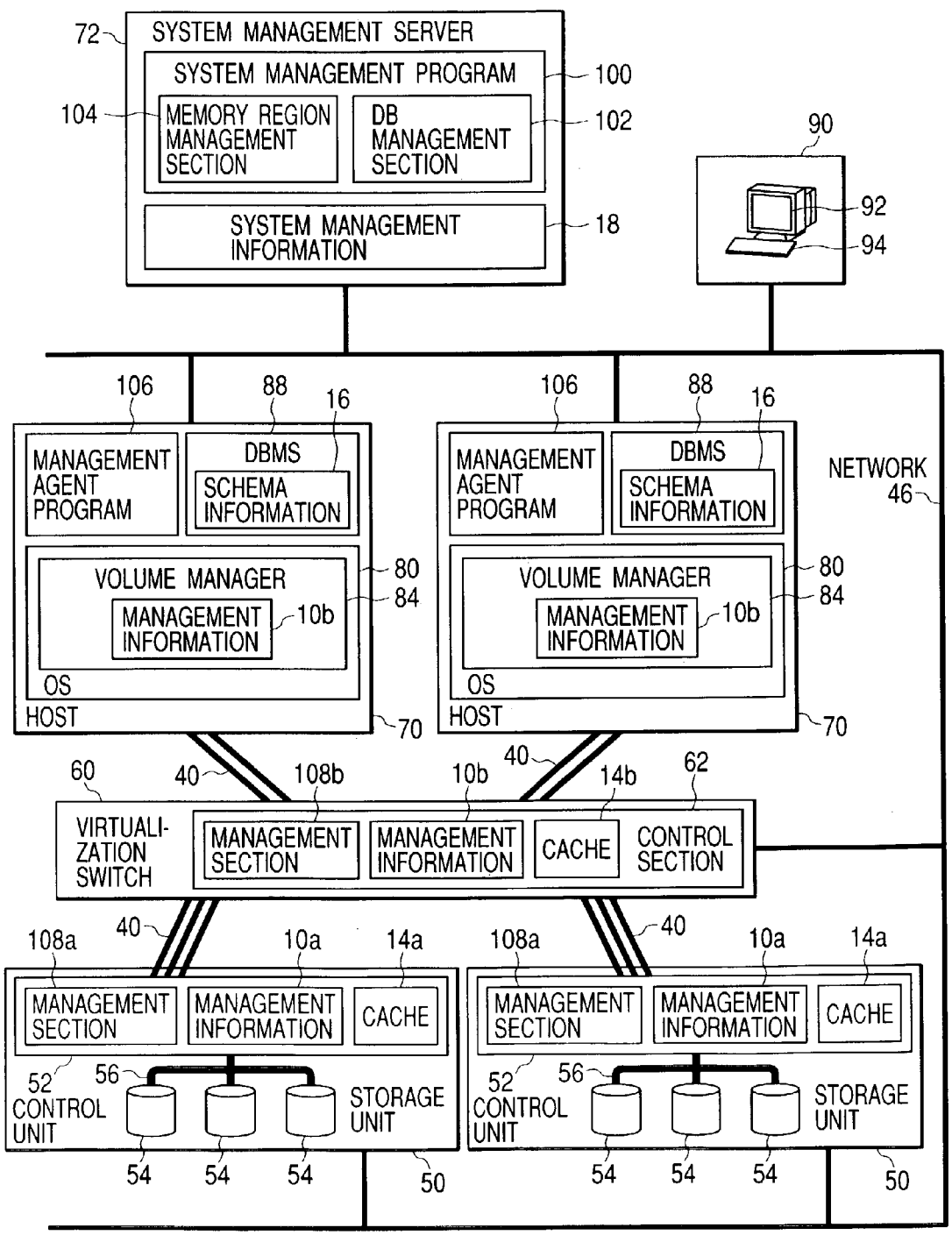
FIG. 1 illustrates a configuration of a computer system in a first embodiment of the present invention.

FIG. 1 illustrates a configuration of a computer system of the first embodiment. The computer system comprises a computer to use storage units when the DBMS operates (hereinafter referred to as "host") 70, a computer for management of the computer system (hereinafter referred to as "system management server") 72, a virtualization switch having the virtualization function 60 and a storage unit 50. Each element is connected to a network 46 for mutual communication.

The host 70, virtualization switch 60 and storage unit 50 are mutually connected with a communication line (hereinafter referred to as "I/O path") 40. I/O process between the host 70 and storage unit 50 is performed using the I/O path 40. This I/O path 40 may be replaced with a communication line for data transfer among above elements using different physical media and protocols. Moreover, the same communication line may also be used as the network 46 and I/O path 40.

The storage unit 50 includes a control unit 52 and at least a hard disk drive 54. These elements are connected with an internal bus 56. The control unit 52 comprises a management section 108a, management information 10a and a cache 14a.

The storage unit 50 provides one or a plurality of logical units 208 to external devices by virtualizing physical storage region of the hard disk drive 54. The logical units 208 provided to other apparatus may be configured corresponding to the hard disk driver 54 on one to one basis or may also be configured corresponding to the storage regions formed of a plurality of hard disk drives 54.

The management information 10a is stored for management of the storage unit 50. The cache 14a is a memory for temporary storing of partial data in the storage region provided by the storage unit 50. This cache 14a is not always requested to exist.

A management section 108a controls address conversion between the logical unit 208 and a physical storage region of the hard disk drive 54 using the management information 10a. Moreover, when the storage unit 50 has the remote mirroring function and snapshot mirror function, setting of such functions is stored within the management information 10a. Further, information about DB is also stored in the management information 10a and this information is used for the control of data prefetch to the cache 14a and optimization process of storing location of data for the hard disk drive 54.

Moreover, depending on the instruction received from an external device via the network 46, the management section 108a dynamically changes, a storing location in the hard disk drive 54 of the data belonging to the logical unit 208. Here, a partial sentence, "management section 108a dynamically changes" means "a storing location is changed without intermission of the processes in the system". Moreover, setting and control of the remote mirroring function and snapshot mirror function are performed from the external side via the network 46.

The management section 108a of the storage unit 50 is not always requested to dynamically change the storing location of data. In addition, the remote mirroring function and snapshot mirror function may also be eliminated.

The virtualization switch 60 includes a control section 62. The control section 62 includes the management section 108b, the management information 10b and the cache 14b.

The virtualization switch 60 recognizes, using the management section 108b, the logical unit 208 provided from the storage unit 50 connected to the virtualization switch 60 and also provides a virtual volume 206 created by virtualizing the storage region in the recognized logical unit 208 to the other apparatuses.

The management information 10b is used for management of the virtualization switch 60.

The cache 14b is a memory for temporary storing of a part of data in the storage region provided by the virtualization switch 60 The cache 14b is not always requested to exist.

The management section 108b controls address conversion between the virtual volume 206 and logical unit 208 using the management information 10b. In addition, when the virtualization switch 60 has the remote mirroring function and snapshot mirror function, setting of these functions is also stored in the management information 10b. Furthermore, information about DB is also stored in the management information 10b and this information may be used for control of prefetch of data to the cache 14b or the like.

Moreover, the management section 108b dynamically changes the storing location of the virtual volume 206 in the logical unit 208 depending on the instruction received from an external device via the network 46. Further, setting and control of the remote mirroring function and snapshot mirror function may be performed from an external side via the network 46.

The management section 108b of virtualization switch 60 is not always requested to dynamically change the storing location of data. Moreover, the remote mirroring function and snapshot mirror function may also be eliminated.

The host 70 comprises a CPU and a memory. The CPU executes the programs such as an operating system (OS) 80, DBMS 88 and management agent program 106. The OS 80 includes a volume manager 84. In addition, the OS 80 also includes a raw device function for direct access to the storage region such as virtual volume 206 using the file I/O interface which is the same as the software interface for files.

The DBMS 88 uses the dada stored in the storage region provided by the storage unit 50. This DBMS 88 also stores the schema information 16 required for management of the DBMS such as data structure definition information and management information of data storing location of data structure. In FIG. 1, only one DBMS 88 exists on the host 70 but this embodiment 1 can also be applied when a plurality of DBMSs 88 operate on the same computer.

The volume manager 84 is a program to be executed by the CPU of host 70 to recognize the virtual volume 206 or logical unit 208 provided by the other apparatus and then to provide, to the DBMS 88, at least one virtual logical volume 204 combining at least one or more storage regions belonging to such volume or unit. These programs are installed to the host 70 using the network or storage medium.

The volume manager 84 is used for management of correspondence between the logical volume 204 and virtual volume 206 or logical unit 208 using the management information 10c. Moreover, when the volume manager 84 has the remote mirroring function and snap shot mirror function, setting of these functions is also stored in the management information 10b. In addition, the volume manager 84 may have a function to dynamically change the storing location of data.

The storage unit 50, virtualization switch 60 and volume manger 84 (hereinafter these are referred in summary to as "virtualization function") has the function for dynamic creation, regional expansion and deletion of the logical volume 204, virtual volume 206 and logical unit 208 (hereinafter these are referred in summary to as "virtual data structure" and that formed by adding the hard disk drive 54 to the virtual data structure is referred in summary to as "managed data structure") Here, the partial sentence "dynamic creation, regional expansion and deletion" means creation, regional expansion and deletion of virtual data structure without intermission of operation of the computer system.

The management agent program 106 receives when the instruction from the system management server 72 for dynamic change of data mapping and issues creation/regional expansion/deletion of virtual data structure is issued to the volume manager 84. Moreover, this management agent program 106 also transmits information from the volume manager 84 to the system management server 72. Further, this program is additionally executed when the processing script created by the system management server 72 is executed in the host 70. Here, the DBMS 88 and OS 80 may also have the function of the management agent program 106.

The system management server 72 comprises a CPU and a memory. The memory stores a system management program 100 and system management information 18. The system management program 100 realizes the function of the system management server 72 and includes a DB management section 102 for management of data structure of each DB and a storage region management section 104 for setting and management of storage region in the system. The system management information 18 includes information of data structure of each DB and information used for management of storage region in the system.

A management terminal 90 including a display screen 92 and an input device 94 is connected to the system via the network 46. As the input device 94 for example, a keyboard and a mouse are used. The management terminal 90 may also be connected to the system management server 72 using the internal bus.

In FIG. 1, the DB system management server 72 is independent of the other virtualization function but a desired virtualization function may operate as the system management server 72. Particularly, the DBMS 88 may have the function provided by the system management server 72.

In this embodiment, management of data structure of DB and management of storage region are realized with only one system management program 100 to simplify the description but such management may also be realized with several separated programs. In this case, management may be realized with different computers and virtualization functions.

Figure 2:
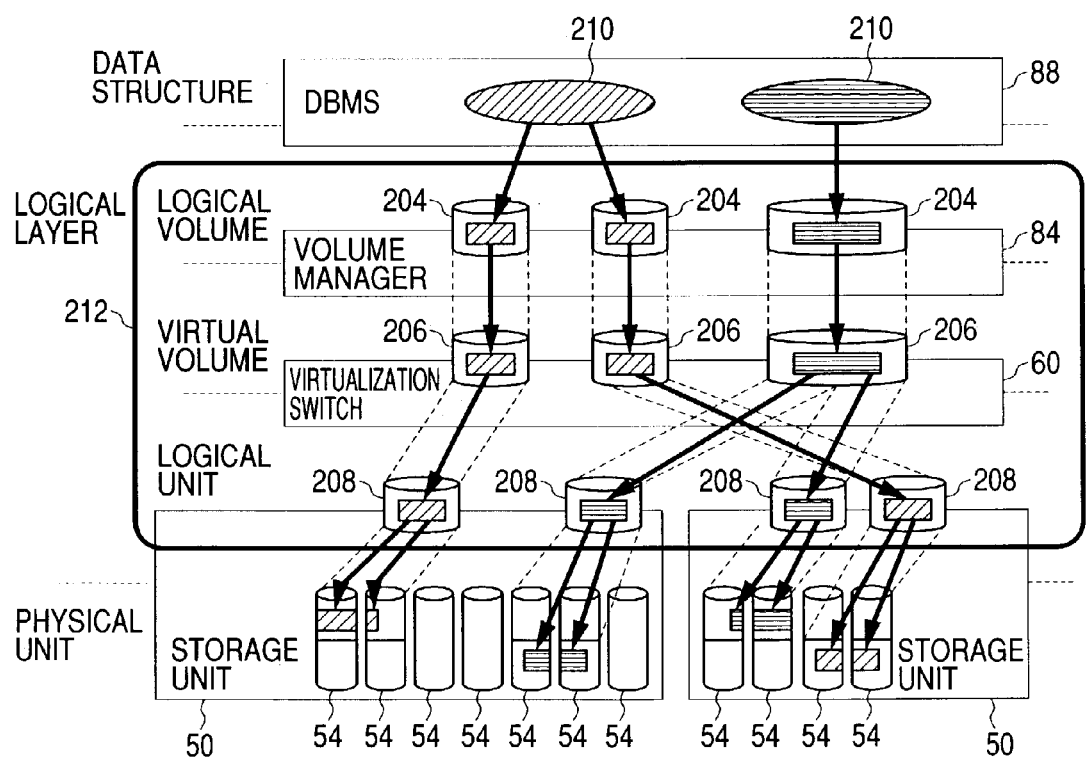
FIG. 2 illustrates the concept of hierarchical configuration of data mapping in the first embodiment.

FIG. 2 illustrates a hierarchical configuration of data mapping in this embodiment. In this FIG. 2, a virtualization switch 60 exists between the host 70 and the storage unit 50. In the pair of hierarchical layers, any one provided nearer to the DBMS 88 is called the upper hierarchical layer, while the other provided nearer to the hard disk drive 54 is called the lower hierarchical layer.

In FIG. 2, the DBMS 88 makes access to the logical volume 204 provided by the volume manager 84 storing data structure 210 such as table, index and log under the management thereof. As illustrated in FIG. 2, it is also possible to store the data of a certain data structure 210 to a plurality of logical volumes 204 by dividing the data. Meanwhile, a logical volume 204 holds only a data structure 210 in this embodiment. In the same way a virtual data structure holds only the data of a data structure 210.

The volume manager 84 converts an access to the logical volume 204 to the access to the region of virtual volume 206 corresponding to the logical volume 204. The virtualization switch 60 converts an access to the virtual volume 206 to the access to the region of corresponding logical unit 208. The storage unit 50 converts an access to the logical unit 208 to the access to the hard disk drive 54 corresponding to the logical unit 208.

Although not illustrated in the figure, a certain virtualized data may be stored in common to a plurality of hosts 70. For example, the hosts 70 in the system which is required high availability may share the same storage regions. Data sharing may be realized when the virtualization functions of a plurality of upper hierarchical layers (virtualization switch 60 or the like) refer to the same storage region in the logical unit 208 of the lower hierarchical layer or the like.

The virtualization switch 60 is never limited only to single stage and may be used in the desired stages. Moreover, even when the volume manager 84 of host 70 does not exist or is not used, the virtualization switch 60 does not exist or the storage unit 50 does not have a mapping function between a logical storage region and physical storage region and provides in direct the storage region of hard disk drive 54 to the external side, this first embodiment of the present invention can also be applied when one or more stages of virtualization function are provided in the system as a whole.

When the storage unit 50 does not have the mapping function between the logical storage region and physical storage region, only the information about what kind of hard disk drive 54 the storage unit 50 has is required for the system management server 72. In this case, exchange of mapping information between the system management server 72 and storage unit 50 is unnecessary and the storage unit 50 is not always required for connection to the network 46.

FIG. 3 illustrates a data structure of management information 10b to be stored by the virtualization function. The management information 10a of the storage unit 50 has the same structure as that of FIG. 3. The management information 10b includes mapping information 302, function setting information 304 and DB structure information 306.

The mapping information 302 stores the information for indicating a hierarchical relationship of data and includes entries 312 to 322. The entry 312 stores the information indicating an upper virtual data structure identifier which indicates the virtual data structure provided to the upper layer by the virtualization function including the relevant management information 10b.

The entry 314 stores the information for indicating the block number in upper atructure which indicates a storage region in the virtual data structure corresponding to the upper virtual data structure identifier. The entry 316 stores the information for indicating a lower virtualization function identifier which indicates the lower virtualization function for providing the storage region to the virtualization function including the relevant management information. This entry does not exist in the management information 10a in the storage unit 50. The entry 318 stores the information for indicating a lower managed data structure identifier as the identifier of managed data structure (identifier of hard disk drive 54 in the management information 10a in the storage unit 50) provided by the virtualization function corresponding to the lower virtualization function identifier. The entry 320 stores the information for indicating a block number in lower structure which indicates a storage region of the managed data structure corresponding to the lower managed data structure identifier.

The entry 322 in which the upper virtual data structure identifier is "Free" is in the condition where the virtualization function having the relevant management information can utilize the region thereof, but indicates the storage region of the lower layer which is not provided for the virtualization function in the upper layer. When the virtualization function has the function for dynamically changing the storing location of data, the data migration process is performed by copying data to this storage region in the lower hierarchical layer.

The function setting information 304 is used for setting and management of the functions when the virtualization function includes the snapshot mirror function and remote mirroring function and this information is included in the management information 10a, 10b of the virtualization function having such functions. The function setting information 304 has the entries 312, 334 and 336.

The entry 312 is identical to that described above. The entry 334 stores the information for the setting function which indicates the function set for the upper virtual data structure described for the entry 312. The entry 336 stores details of function setting which is the detail information of the function described for the entry 334.

For example, when the setting function is the snapshot mirror function, information of upper virtual data structure of the destination for creation of snapshot and information of upper virtual data structure to be synchronized when the snapshot is created in synchronization with the other upper virtual data structure are stored. When the setting function is the remote mirroring function, information of destination for the remote mirroring and information of group of a plurality of upper virtual data structure in which the write sequence should be guaranteed at the time of mirroring process are stored.

The DB structure information 306 is used in the storage unit 50 and virtualization switch 60 to perform management of cache 14a, 14b and optimization of storing location of data by utilizing the information about DB and this information is not always required to be stored in all virtualization function. The DB structure information 306 includes the entries 342 to 348.

The entry 342 stores a DB identifier for identifying DB for storing data to be stored. The entry 344 stores a data structure identifier for identifying a data structure to which the relevant data belongs. The entry 346 stores a class of structure which is the information about the class of data structure.

The entry 348 stores the information for indicating a upper virtual data structures which hold the data corresponding to the data structure identified by the entry 342, 344 as corresponding upper virtual data structure. The information of access sequence for sequential access or the like is appended to the information stored in the entry 348 as required.

Figure 4:
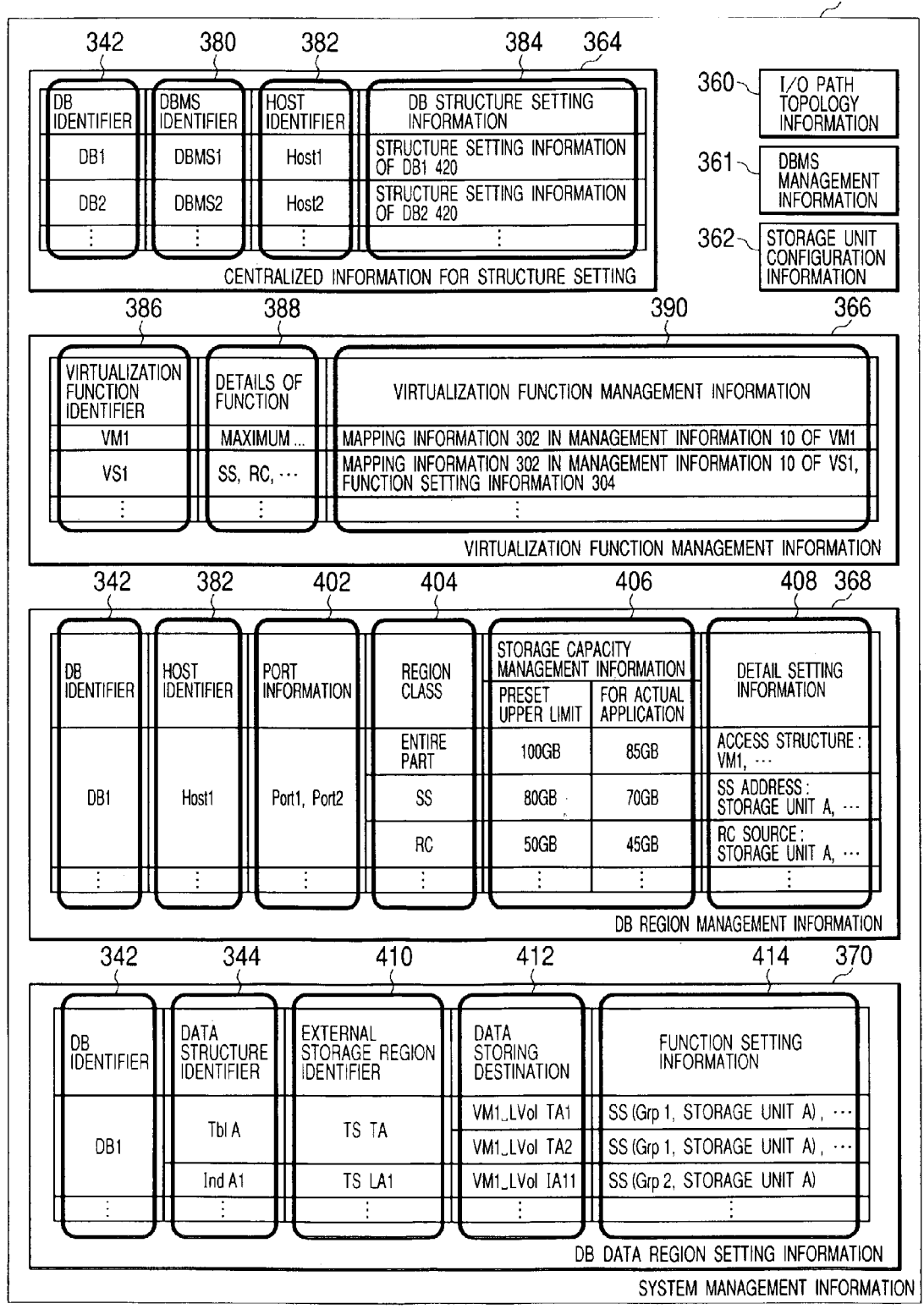
FIG. 4 illustrates a data structure of system management information 18.

FIG. 4 illustrates a data structure of system management information 18 stored in the system management server 72. The system management information 18 includes I/O path topology information 360, DBMS management information 361, storage unit configuration information 362, centralized information for structure setting 364, virtualization function management information 366, DB region management information 368 and DB data region setting information 370.

The I/O path topology information 360 stores the information about connection among apparatuses in the computer system under the management of system management server 72, particularly about the I/O path 40.

The DBMS management information 361 stores the information about the DBMS 88 existing in the system, for example, the information indicating in which host the DBMS operates or the restriction condition for each DBMS or the like.

The storage unit configuration information 362 stores the information which is assigned as the fixed one in the storage unit 50, for example, the information about a redundancy method (RAID level) of hard disk drive group formed of the hard disk drives 54 and performance of the hard disk drive 54.

The centralized information for structure setting 364 stores the setting information of data structure of DB existing in the computer system under the management of the system management server 72. The centralized information for structure setting 364 includes entries 342, 380 to 384.

The entry 342 is already described above. The entry 380 stores a DBMS identifier as the information to identify the DBMS 88 which manages the corresponding DB. The entry 382 stores a host identifier as the identifier of host 70 which executes the DBMS 88 for management of DB corresponding to the entry 342. Sometimes several DBMS 88 and hosts share the same DB data for high availablity. In this case, a entry 342 corresponds to plural entries 380, 382. The entry 384 stores the structure setting information 420 as the setting information of data structure of the DB for each DB identified by the entry 342. Details of the structure setting information 420 will be described later.

The virtualization function management information 366 stores the information about virtualization function in the computer system under the management of the system management server 72. The virtualization function management information 366 includes the entries 386 to 390.

The entry 386 stores a virtualization function identifier to identify the virtualization function. The entry 388 stores the functions provided by the virtualization function identified with the entry 386 and details of function which are the information about restriction of virtual data structure provided by such function. The entry 390 stores a part of the management information 10a, 10b stored by the virtualization function identified with the entry 386 at least the mapping information 302 in the at corresponding management-information 10a 10b, as the virtualization function management information. Moreover, the entry 390 also stores, when the virtualization function provides various functions, the function setting information 304 about these functions.

The DB region management information 368 stores the information required for region management of the DB in the computer system under the management of the system management server 72. The DB region management information 368 includes entries 342, 382, 402 to 408.

The entries 342, 382 are already described above. The entry 402 stores port information 402 as the information about port connected to the I/O path 40 or the network 46 which is used for data access by the host identified with the entry 382. A entry 342 may corresponds to plural entries 382, 402 in the case of a redundant system.

The entry 404 stores the information of region class which is utilized as the label for management of region. For the region class, the "entire part" indicating the entire part of DB identified with the entry 342, "SS" indicating the region to which the snapshot mirror function is assigned and "RC" indicating the region to which the remote mirroring function is assigned or the like are utilized.

The entry 406 stores, for every region depending on the region class indicated by the entry 404 or the DB identified with the entry 342, the storage capacity management information which is the information about the upper limit setting value of storage capacity which may be available for each region class and actual amount of assigned region which is actually used. The entry 408 stores the detail setting information which is the information about the detail setting required for management of region in each region class. The detail setting information 408 includes following examples.

1) Information about virtual data structure which the DBMS 88 for management of corresponding DB can handle such as a kind, the maximum size and maximum number of virtual data structure.

2) Requirements to virtualization functions to realize the designated snapshot mirror function and remote mirroring function 3) Information about a destination of mirroring process in the remote mirroring function. Particularly, destination of mirroring process when the remote mirroring function is implemented for the computer system not under the management of the system management server 72

Here, it is also possible to commonly store the information stored in the entries 402, 404, 406 and 408 in a plurality of DBs and to perform simultaneous management of a plurality of DBs.

The DB data region setting information 370 stores the information required for management to indicate in what manner the storage region of DB is assigned regarding the data structure of DB existing in the computer system under the management of the system management server 72. The DB data region setting information 370 includes entries 342, 344, 410 to 414.

The entries 342 and 344 are already described above. As the information about data structure of DB identified with the entries 342, 344, the entry 410 stores, the information about external storage region identifier for management of storage region (such as tablespace) in which the data structure is stored with the DBMS 88. The entry 412 stores the information in the data storing region to indicate the storage region where the DB is stored. Here, the information about virtual data structure which is used in direct by the DBMS 88 for management of DB corresponding to the entry 342 is stored. The entry 414 stores, when the function such as the snapshot mirror function is required to the region corresponding to the entry 412 for the data structure of DB, the function setting information 414 which is the information to indicate where the preset function is performed. The function setting information 414 further stores, as a part of the information about the function, the information about the synchronization group when the snapshot mirror is obtained and the group for ensuring the write sequence in the remote mirroring process.

Figure 5:
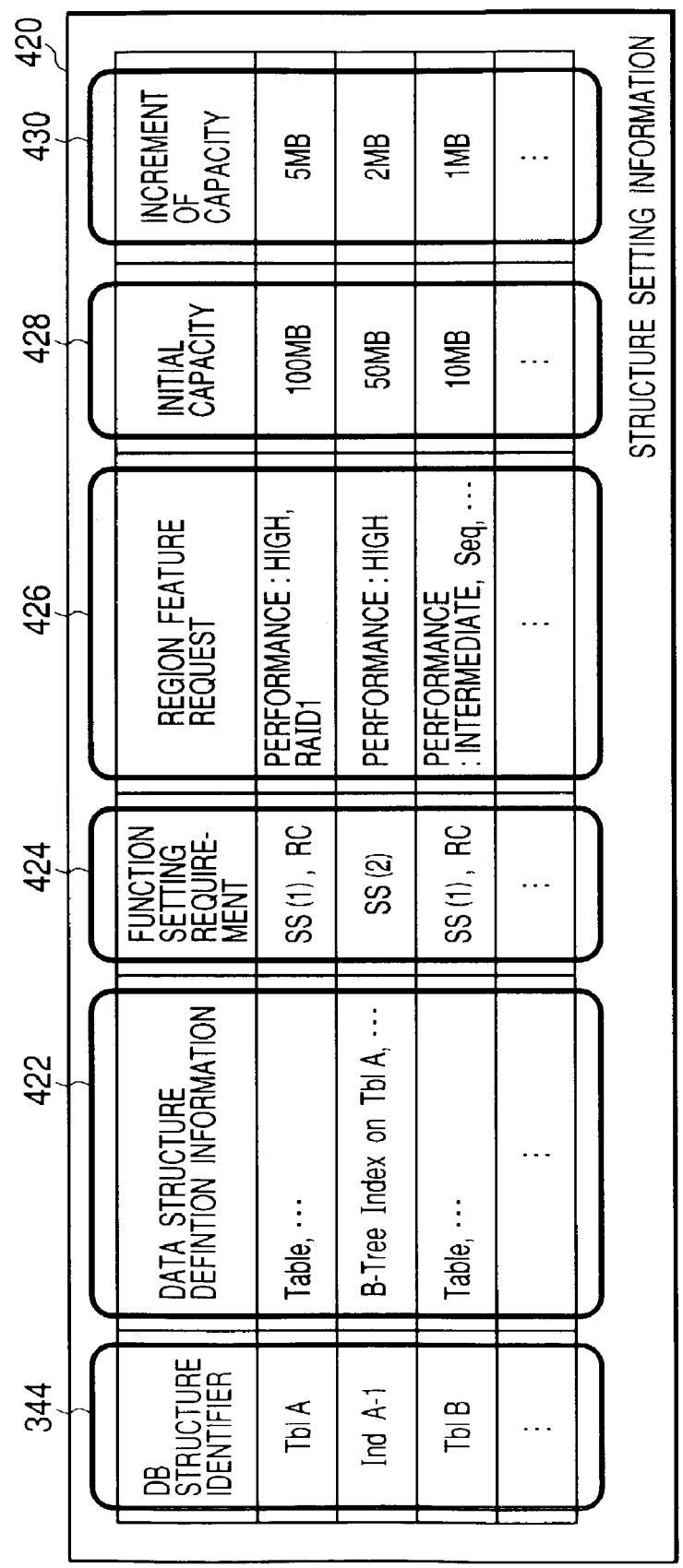
FIG. 5 illustrates a data structure of structure setting information 420.

FIG. 5 illustrates a data structure of the structure setting information 420. The structure setting information 420 includes entries 344, 422 to 430. The information for identifying the DB corresponding to the structure setting information 420 will be designated separately.

The entry 344 is already described above. The information about data structure corresponding to the entry 344 includes the following information. The entry 422 stores the data structure definition information which is required for defining data structure thereof. The entry 424 stores a function setting requirement which is the information about the function required to be set to the storage region where the corresponding data structured is stored. In this case, the function identifying information is also included when a plurality of groups are created for management in the snapshot mirror function and remote mirroring function. Particularly when setting of function is not required, an invalid value is stored. The entry 426 stores a region feature request which is the information about features requested to the storage region to store the data structure corresponding to the entry 344 such as high performance and RAID structure. The entry 428 stores an initial amount which is the information about amount of capacity which is assigned first for the corresponding data structure. The entry 430 stores increment of capacity which is the increment of storage capacity when the storage region is expanded for data structure corresponding to the entry 344. The entries 426, 428 and 430 may store information which does not actually exists or invalid values (which are not set).

Processing sequence for management of region of DB will then be described. In the following sequence, an instruction from an administrator is issued through a management terminal 90. Instruction from the system management server 72 is sent as follows via the network 46. Instruction is sent in direct to the storage unit 50 and virtualization switch 60. Instruction is sent to the volume manager 84 via the management agent program 106. To the DBMS 88, instruction is issued in direct or a processing script is created and it is executed on the host 70 where the DBMS 88 is executed via the management agent program 106.

Figure 6:
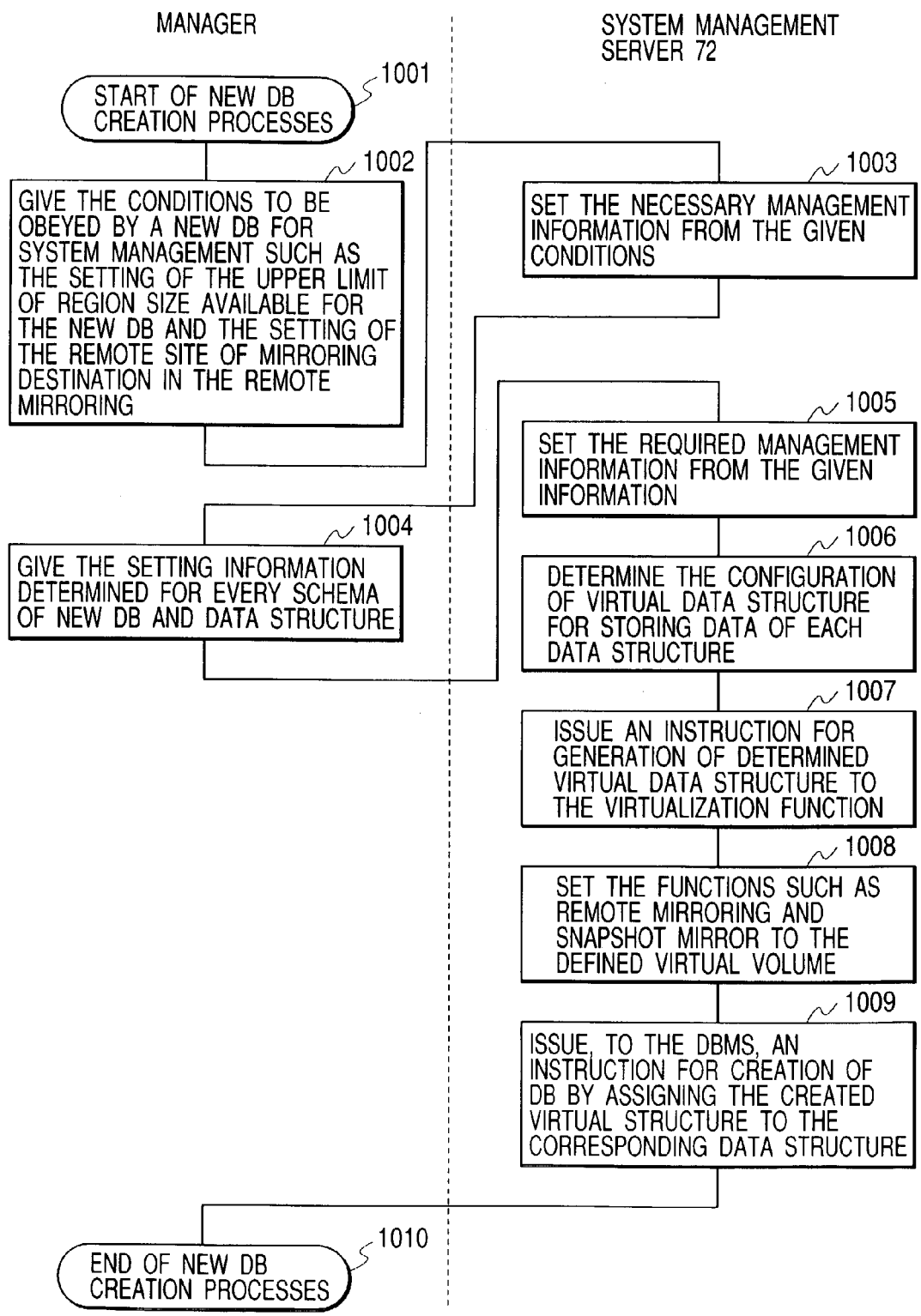
FIG. 6 illustrates a process flow of the processes to create a new DB.

FIG. 6 illustrates a processing sequence to create a new DB. For simplification of description, the process for error is eliminated in this sequence. The processes to be executed by the administrator are illustrated on the left side of FIG. 6, while the processes to be executed by the system management server 72 are illustrated on the right side. If an error occurs during the process sequence, the process is once interrupted and the process to return to the original structure is executed when it is possible.

An administrator starts the new DB creation process. In this timing, it is assumed that the system management information 18 stores the latest data (step 1001). Subsequently, the administrator sets various conditions to be obeyed by the new DB for management thereof. Various conditions are set when the administrator gives the DB setting information 450 to the system management server 72 (step 1002).

Figure 7:
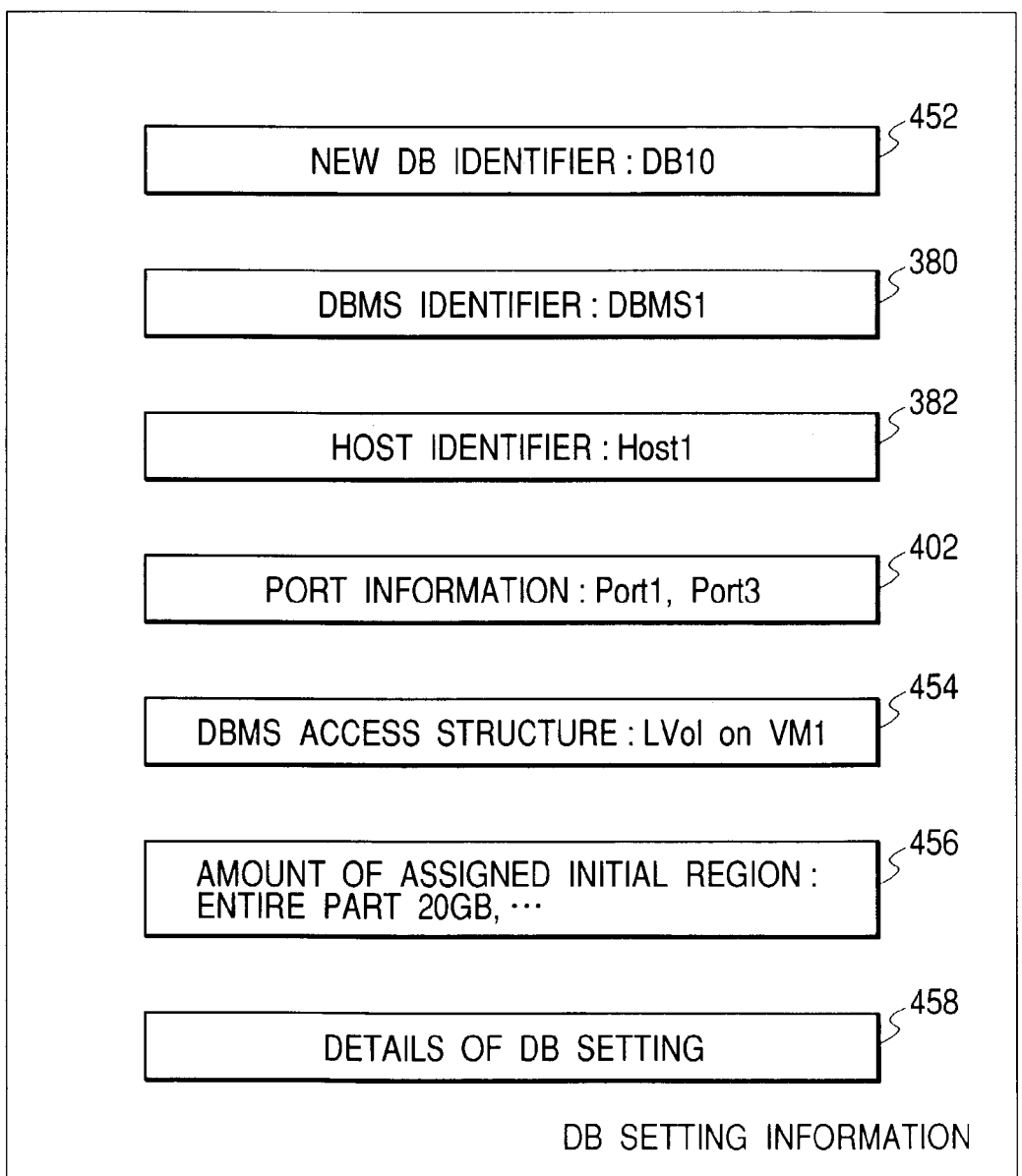
FIG. 7 illustrates a data structure of DB setting information 450.

FIG. 7 illustrates a data structure of the DB setting information 450 which is designated in the step 1002. This DB setting information includes entries 380, 382, 402, 452 to 458.

The entry 452 stores a new DB identifier which is used to identify the new DB to be newly created from now. The system management server 72 utilizes this value as the DB identifier. The entries 380, 382 and 402 are already described above and designate the DBMS 88 for management of the new DB, the host which executes the DBMS 88 and the I/O port to be used by the host. The entry 454 stores DBMS access structure which is the information about a kind of the virtual data structure to which the DBMS 88 identified with the entry 380 recognizes and makes access and virtualization function to provide these virtual structures accessed by the DBMS 88 directly. In order to construct a redundant system where plural DBMS 88 can access the same DB data, the plural sets of entries 380, 382, 402, 454 may be specified.

The entry 456 stores amount of assigned initial region which is the information about available storage capacity assigned first for the new DB. Since storage capacity management information in the DB region management information 368 is set based on the information stored in the entry 456, amount of assigned initial region should be set with consideration of the region class at the time of using various functions. When the new DB is administrated in common to the other DBs, the DB identifiers of the DB to be administrated in common are stored in this entry.

The entry 458 stores details of setting of DB which are the other information about the new DBs. When the remote mirroring function is required, especially in the case that the destination storage unit of mirroring process is not managed by the system management server 72, the information about the setting of the destination of mirroring process should be included in the entry 458 as required. Moreover, various restriction conditions provided by an administrator are also included in the entry 458.

The system management server 72 sets the necessary information to the system management information 18 based on the DB setting information 450 received. First, an entry for a new DB is created in the centralized information for structure setting 364. Subsequently, the information for management of region of the new DB is stored in the DB region management information 368. In this case, when the information about various functions to be utilized is stored in the entry 458, this information is stored to the corresponding region of the entry 408 (step 1003).

Next, an administrator gives the structure setting information 420 to the system management server 72 together with the DB identifier of the new DB. In this case, when not particularly needed, the entries 424, 426, 428 and 430 may be eliminated (step 1004). The processes in the steps 1002 and 1004 may be executed simultaneously.

When a new DBMS 88 is introduced simultaneously with creation of a new DB, the information about the storage region setting method for the management information of the DBMS 88 itself such as log and schema information 16 is required. These information are specified by an administrator in the manner that these are included in the DB setting details 458 or structure setting information 420 in the DB setting information 450. Otherwise, the standard setting method should be stored in the DBMS management information 361 and then it is used. Thereafter, the management information when the new DBMS 88 which is installed simultaneously us is processed in the same manner as the other data structure.

The system management server 72 sets the necessary information to the system management information 18 based on the received DB identifier and structure setting information 420. First, the structure setting information 420 is stored to the corresponding region in the centralized information for structure setting 364. Subsequently, the entry corresponding to the new DB is set in the DB data region setting information 370 from the designated DB identifier and entry 344 in the structure setting information 420 (step 1005).

Thereafter, the system management server 72 determines a configuration of the virtual data structure storing the data of new DB according to the given information in the DB setting information 450 and the structure setting information 420. Namely, a configuration of the virtual data structure to be accessed by the DBMS 88 designated with the entry 454 in the DB setting information 450 is determined.

The virtual data structure to be created is configured with the storage region provided by the virtualization function in the lower hierarchical layer and its storage region is assigned to the region on the hard disk drive 54 via a plurality of virtualization functions. Therefore, the optimum storage region is obtained from those on the hard disk drive 54 corresponding to the region where "Free" is set in the mapping information 302 in the management information 10a, 10b of certain virtualization function so as to satisfy the conditions and functions designated with the DB setting information 450 and structure setting information 420 by referring to the I/O path topology information 360, storage unit configuration information 362 and virtualization function management information 366. The configuration of virtual data structure for storing a data structure is determined from the storage region obtained above. Now only the configuration where a virtual data structure holds the data of a structure is allowed. At the same time the mapping among the virtualization functions should be also considered. The initial capacity designated with the entry 428 in the structure setting information 420 is identical to a size of the determined virtual data structure. If a value of the initial capacity is not specified, the system management server 72 uses the predetermined default value. In the case when a virtual data structure is smaller than the designated size, a plurality of virtual data structures should be assigned.

The conditions checked in the above processes are as follows (with the order of priority). When there are many choices of configuration with the same priority, conditions of further lower priority are considered to determine the configuration of the virtual data structure.

1) When there is a designation (restriction condition) for the virtualization function to realize a storage region and various functions, a configuration of virtual data structure is created to satisfy such designation (restriction condition).
2) A configuration of virtual data structure is created via the available virtualization function by obtaining the virtualization function which can realize the function requested to the region to store the dada structure.
3) A configuration of virtual data structure is created to satisfy the features requested to the region to store the data structure.
4) When the virtual data structure with continuous storage region can be obtained in each virtualization function, the such virtual data structure is preferentially used as the configuration element of the virtual data structure to store the data structure.

Basically, possible configurations of all virtual data structures to be thought to satisfy the conditions 1) and 2) described above are detected and the optimum configuration is selected using the conditions 3) and 4) as criteria of priority from such possible configurations. In the case when no virtual data structure satisfying the conditions 1) and 2) can be created for any one of data structures, the process should be treated that error occurs. When it is required that the DB data should be accessed by the plural DBMS 88 and a function should be set to its storage region, it should be checked wheter the layer of the virtualization function which provides the virtual data structures referred to by plural higher virtualization functions and DBMS 88 is higher than that of the virtualization function which provides the specified function or the same. In the case when this check cannot passed, the process also should be treated that an error occurs.

Plural virtual data structures may be assigned to one data structure. When it is required to set a function to such data structure, it should be confirmed whether the requested function can be realized even if a plurality of virtual data structures are used, for example, whether synchronization can be attained with the snapshot mirror function among a plurality of virtual data structures or whether a write sequence is assured in the mirroring process with the remote mirroring function (step 1006).

In succession, for realization of configuration of the virtual data structure obtained, the system management server 72 issues, instructions to create such virtual data structures to the virtualization functions. These instructions for creation are issued in order of layer (lowest layer first basis) When the virtual data structure to be newly created uses the region where "Free" is not set in the mapping information 302 in the management information 10a of the storage unit 50, an instruction to release the such region without "Free" status is issued to the virtualization function related to this region where prior to creation of the new virtual data structure. Instructions to set access limitation to the created virtual data structures may be issued simultaneously as required. When the volume manager 84 does not exist, instructions are issued to the OS 80 to recognize the created virtual volume 206 or logical unit 208 via the management agent program 106.

Thereafter, the information of the created virtual data structure is set to the corresponding part of the entry 412 which holds store the storing destination of data in the DB data region setting information 370 and the storage capacity management information stored in the entry 406 in the DB region management information 368 is updated to the actually assigned value (step 1007).

Subsequently, the system management server 72 issues instructions for setting of functions to the virtualization functions in order to realize the function designated to the data structures. The virtualization functions to be set the functions are ones obtained to fulfill the condition 1) 2) for the determining the configuration of the virtual data structures in the step 1006. Here, the storage region required for operation of the function is allocated and the setting information is exchanged with the computer system not under the management of the system management server 72 as required. Thereafter, the information about the function is set to the corresponding part of the entry 414 to store the function setting information in the DB dada region setting information 370 (step 1008).

Finally, the system management server 72 instructs the DBMS 88 to create a new DB such that the data of data structure to the corresponding created virtual data structure is stored.

First, when the DBMS 88 for management of new DB is newly introduced, an installation script is created. In this case, since the virtual data structure used for the regions to store log and management information of DBMS is also created, an instruction to utilize the created virtual data structure to store such data is also included. In succession, the created script is executed on the host having the host identifier designated with the entry 382 in the DB setting information 450 to install the new DBMS 88.

Thereafter, the schema of new DB is given to the DBMS 88 for management of new DB to create a new DB. The schema of the new DB is created from the basis of the data structure definition information stored in the entry 422 in the structure setting information 420 and the setting given by the DB setting details stored as required in the entry 458 in the DB setting information 450. It should be noted here that the data structure is stored to the virtual data structure created corresponding thereto. In many DBMSs at the present, the data structure such as table and index or the like is independent of the other data structure for external storage region management. For such DBMS, a data structure for external storage region management is assigned to individual data structure for data structures utilizes different data structure for external storage region management. To the data structure for external storage region management described above, the virtual data structure created corresponding to the data structure is assigned. The information about the identifier of the assigned data structure for external storage region management is stored to the corresponding part of the entry 410 to store the information about the structure for external storage region management in the DB data region setting information 370 (step 1009).

When the new DB creation process is completed, an administrator receives a message thereof (step 1010). Thereafter, the system management information 18 is updated to the latest data, if necessary.

Figure 8:
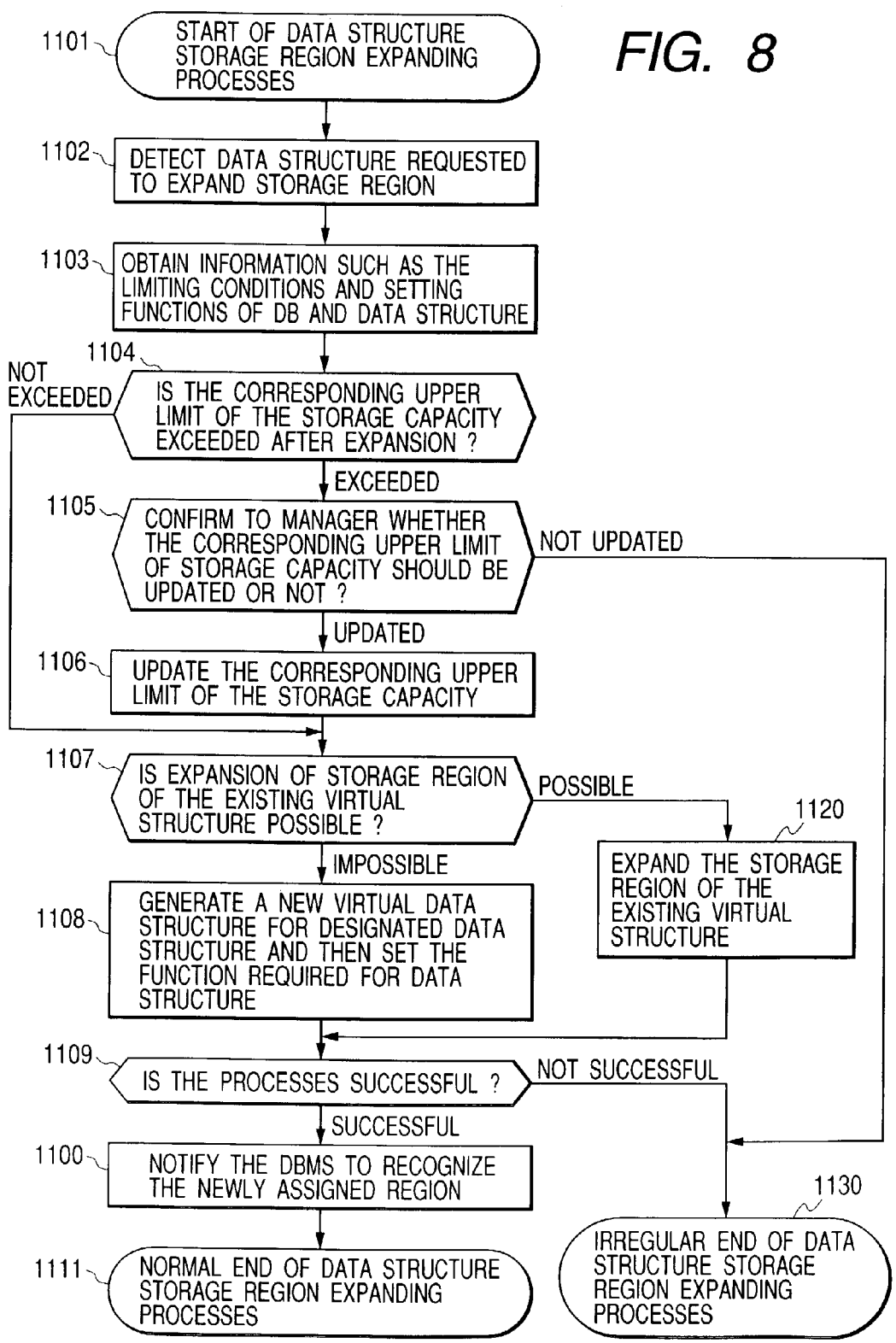
FIG. 8 illustrates a process flow of the processes to expand a storage region for storing a data structure of DB.

FIG. 8 illustrates a processing sequence of expanding the storage region of DB data. This process is performed with the system management server 72.

First, the system management server 72 receives a request to start the process to expand the storage region of data structure. This request may be triggered when an administrator issues an instruction from the management terminal 90 and when the DBMS 88 detects shortage of data storage region. In latter case, the DBMS 88 may issue a region expanding request to the system management server 72. Moreover, it is also possible that the volume manager 84 detects necessity of expansion of storage region and then issues the region expansion request to the system management server 72 via the management agent program 106. As the method with which the volume manager 84 detects necessity for expansion of storage region, several methods could be used such as one in which the DBMS 88 transfers necessity for expansion of region using an application program interface introduced for this purpose and one in which the volume manager 84 detects a writing of data to the non-assigned part of the storage region of the virtual data structure (step 1101).

Subsequently, the virtual data structure in which expansion of region is requested and the information about data structure corresponding to the requested virtual data structure is detected. This process can be realized by searching the entry 412 for storing a data storing destination in the DB data region setting information 370 and then obtaining the corresponding DB identifier and data structure identifier. When the storage region expansion of the data structure is directly requested this step is skipped (step 1102).

In succession, various conditions and functions being set to the corresponding DB and data structure are confirmed. The DBMS 88 which accesses the corresponding DB and data structure is also confirmed. This process can be realized by referring to the corresponding part of the centralized information for structure setting 364, DB region management information 368 and DB data region setting information 370 using the obtained DB identifier and data structure identifier (step 1103).

Next, it is confirmed whether the region exceeds or not the upper limit value of storage capacity of the storage region even after expansion of region. Amount of expansion of region is stored as an increment of capacity to the entry 430 in the structure setting information 420 of every DB stored in the centralized information for structure setting 364. When the amount of expansion of region does not specified, the predetermined default value is defined as the amount of expansion of region. The information for management of limitation of storage capacity is stored as the storage capacity management information to the entry 406 in the DB region management information 368. When a certain function is set for the data structure, the upper limit value of storage capacity for the preset function, which is identified by the region class in the entry 404, is also confirmed. When the amount of expansion of region does not exceed the upper limit values of storage capacity described above, the process goes to the step 1107 but if the amount of expansion exceeds any one of limit values, the process goes to the step 1105 (step 1104).

Next, it is confirmed through the management terminal 90 whether the upper limit value of storage capacity should be updated or not by informing the administrator that it has been attempted to expand the region to store the data of certain data structure but this expansion will exceed the upper limit value of the storage capacity. When the administrator has issued an instruction for update, the process goes to the step 1106. When the administrator has issued an instruction for no update, the process goes to the step 1130 and the process terminates abnormally as a result of region expansion process fault (step 1105).

Next, the upper limit value of the storage capacity is updated. The upper limit value of the storage capacity in the storage capacity management information stored to the entry 406 in the DB region management information 368 is updated to a new value (step 1106).

Subsequently, it is confirmed the DBMS 88 searches whether the storage region of the virtual data structure being used by the DBMS 88 as the destination to store the data structure at present can be expanded or not. This check can be realized by confirming various restrictions of the virtualization function stored to the entry 388 in the virtualization function management information 366 and by confirming various restrictions of the detail setting information for storage region management of DB stored to the entry 408 in the DB region management information 368. Here, "the storage region of virtual data structure can be expanded" in the above sentence means that the storage region can be expanded in any management structure in each layer corresponding to the virtual data structure to be accessed by the DBMS. When plural DBMS 88 can access the DB data to which the data structure of which the storage region is being expanded, belongs the check of this step should be performed to all corresponding to DBMS 88. When the storage region of the virtual data structure can be expanded, the process goes to the step 1120. If the storage region cannot be expanded, the process goes to the step 1108 (step 1107).

When the storage region of the virtual data structure can be expanded in the step 1107, all virtual data structures in each layer corresponding to the virtual data structure to be accessed by the DBMS can be expanded and an instruction is issued to the corresponding virtualization function to expand the storage region of the virtual data structure (step 1120).

When the storage region of the virtual data structure cannot be expanded in the step 1107, a new virtual data structure to be used by the DBMS 88 to store the data structure should be created. The configuration of virtual data structure to be newly created is determined by the same method as that in the step 1006. Attention items for dividing a data structure into a plurality of virtual data structures have been described and it is also required to satisfy these attention items in a set of the existing virtual data structure and a newly created virtual data structure.

Thereafter, a new virtual data structure is created and the functions required for the newly created virtual data structure are set in the same way as the step 1007 and 1008 (step 1108).

The processes in the steps 1120 and 1108 might fail. Therefore, it is confirmed here whether these processes have succeeded or not. When the processes have succeeded, the process goes to the step 1110. If the processes have failed, the process goes to the step 1130 to abnormally terminate the process as a region expansion process failure (step 1109).

When the new storage region for expansion of storage region used to store the data structure can be allocated successfully, it is required for the DBMS 88 to recognize this success to use the newly assigned region. Therefore, when the storage region of the existing virtual data structure is expanded, it is notified to the corresponding to DBMS 88. When the virtual data structure for data storage is newly created, an instruction is issued to the corresponding DBMS 88 to add the newly created virtual data structure to the data structure for external storage region management corresponding to the data structure which is required to be expanded (step 1110). Thereafter, the expansion process of data structure storage region is normally terminated (step 1111).

The data storage region of DB is released as follows when the DB is deleted.

First, it is confirmed that the DB is deleted in the DBMS 88. When plural DBMS 88 can access the DB data which is being deleted, it is confirmed whether the settings about the DB are deleted by all corresponding DBMS 88. To ensure this deletion, an administrator basically issues an instruction for deletion of DB to the DBMS 88 via the system management server 72.

Next, the system management server 72 instructs the corresponding virtualization function to cancel the function being set to the virtual data structure which stores data of the deleted DB and thereafter instructs the virtualization function to delete the designated virtual data structure.

Finally, the system management server 72 deletes all information corresponding to the deleted DB in the system management information 18.

The system management server 72 stores the setting information about mapping of data structure of DB and various functions for data of data structure. Therefore, when the process such as backup or the like is performed only for the particular DB and data structure of DB, the region to perform the process can be detected using this setting information. Particularly, since a virtual data structure holds only the data of a data structure, the process can be executed efficiently without a process of unwanted data.

In this embodiment, a virtual data structure holds only the data of a data structure. Following optimization can be realized in the virtualization function by utilizing such storing profile.

When the storage unit 50 and virtualization switch 60 include the cache 14a, 14b, it is utilized for the control of these elements that only the data of a data structure exist in a virtual data structure. For example, when the full-scan is performed to the table data, accuracy of prediction for prefetching can be enhanced because it can be expected to make sequentially access to the virtual data structure to store the table data. Moreover, since the access characteristic such as reusability of data or the like is different for every data structure, a cache hit rate can be improved by optimizing the data storage control of cache 14, for example, by changing the storing ratio of data to the cache 14 through the grouping of the virtual data structure.

In addition, optimization of data allocation among the hard disk drive 54 can be realized in the storage unit 50. For example, there is higher possibility for simultaneous access to certain table data and B-Tree type structured index data corresponding to this table data. Therefore, it is recommended to allocate these data on different hard disk drives 54. Moreover, a storage region of the virtual data structure storing table data is assigned to a physically continuous region larger than the pre-specified one on the hard disk drive 54 considering the sequential access to the table data described above. The allocation method of these data can also be utilized as criteria of priority in creation of the virtual data structure.

When a new virtual data structure is created in the steps 1007 and 1108, the system management server 72 gives, the information indicating correspondence between the data stored in the created virtual data structure and the DB data to the virtualization function having the DB structure information 306 in the management information 10a, 10b. And the virtualization function stores such information in the DB structure information 306. The virtualization function can execute optimization described above using the stored information.

<Second Embodiment>

In the second embodiment, the data structure of DB such as table, index and log is grouped for storage region management based on the schema of designed DB and different virtual volumes or the like are respectively assigned in the apparatus having the virtualization function and software. An instruction for creation of the DB to store the data of data structures which belongs to a region managed group of DB to the corresponding the virtual volume or the like is issued to the DBMS. Accordingly, the particular virtual volume or the like holds only the data belonging to the group of particular data structures. The snapshot mirror function and remote mirroring function assigned to the data structure of DB can be set automatically using the grouping process described above. This second embodiment can also be applied to the computer system which specifies severe restrictions on creation of virtual volume or the like (particularly, in regard to the number of virtual volumes or the like for setting the snapshot mirror function and remote mirroring function or the like).

The second embodiment is similar to the first embodiment in the greater part thereof. Only different portions between the second embodiment and first embodiment will be described below.

The configuration of the computer system of this second embodiment is almost identical to that of the first embodiment. Moreover, the OS 80 in the host 70 can have file systems and this second embodiment can also be utilized when the DBMS 88 uses the files provided by these file systems. In this case, the file system has to be able to expand the storage region under the management thereof. An instruction to the file system and a request from the file system may be issued via the management agent program 106.

Differences in the hierarchical configuration of data mapping in the second embodiment are as follows. In the first embodiment, a virtual data structure holds only the data of a data structure. However, in this embodiment, a virtual data structure holds only the data of the data structures summarized to the same group for storage region management (hereinafter, referred to as the "storage management group").

When the DBMS 88 utilizes the files provided from the file system in the OS 80, the file system is created on a certain logical volume or the like. In this case, a plurality of files used by the DBMS 88 may be allocated within the file system. In this second embodiment, it is required that a logical volume or the like holds only the data of data structure belonging to the same storage management group. Therefore, the files provided by a certain file system holds only, the dada of the data structure belonging to a certain storage management group.

The data structure of information used in the second embodiment is different from the first embodiment in the following points.

A virtual data structure holds the data of a plurality of data structures belonging to a certain storage management group. Therefore, when the virtualization function holds the DB structure information 306 in the management information 10a, 10b, the information stored to the entry 348 is composed of an identifier of the virtual data structure and the information to discriminate to which region in the virtual data structure the corresponding data structure is stored.

In regard to the structure setting information 420, there are following differences. The storage management group is introduced with the consideration of the case that the restrictions for virtual data structure to set the functions such as snapshot mirror are particularly severe. Therefore, the information about the storage management group is also included to the function setting requirement stored to the entry 424. Otherwise, the structure setting information 420b is used in place of the structure setting information 420.

FIG. 9 illustrates a data structure of the structure setting information 420b. In comparison with the structure setting information 420 of FIG. 5, the structure setting information 420b introduces the entry 432 to store the identifier of storage management group and isolates the data structure to a pair of tables of the structure defining information 472 and storage management group information 474 using the introduced group identifier. The structure defining information 472 stores the information about the data structure of the DB and includes the entries 344, 422 and 432. The storage management group information 474 stores the information about the storage management group and includes the entries 424 to 432. Contents of the information stored in each entry are already described above.

The processing sequence for creation of a new DB in the second embodiment is different in the following points from that in the first embodiment.

In the step 1006 of FIG. 6, the configuration of the virtual data structure has been determined for every data structure but the altered processes are executed for every storage management group. It is not always required in the step 1004 that the setting information of the storage management group is completely given. In regard to the part to which the setting is not yet given, the storage management group is set in the following sequence.

1) The data structure to which the same function is set is grouped to form a storage management group. When a plurality of groups which require the synchronous requests independently exist in regard to the snapshot mirror and remote mirroring functions, a plurality of groups are defined as independent storage management groups. When several functions are set for only one data structure, a set of these functions is considered as one function. Under this condition, for example, in the case where there are two data structures which should be grouped for write order guarantee in a remote mirroring function but are requested to be set the independent snapshot mirror function, it is required to realize centralized management for a certain function among different storage management groups, namely among different virtual data structures. If such centralized management is impossible in the virtualization function, it is defined as an error.

2) For the data structures where the function setting is not yet requested and initial capacity is less than the predetermined threshold value, these data structure are grouped to become the total initial capacity thereof exceed the threshold value and this group is defined as the storage management group.

3) For the remaining data structures where the storage management group is not set, these data structures are defined as the independent storage region groups respectively.

The data structure for external storage region management has been prepared for every data structure in the step 1009, but it is changed to the manner that the data structure belonging to the same storage management group is stored to the same data structure for external storage region management.

When the DBMS 88 utilizes the files provided by the file system in the OS 80, there are further differences. Namely, in the step 1007, after a virtual data structure is created, it is instructed, to the OS 80, to create a file system which uses a created virtual data structure. In the step 1009, plural files are created on the same file system, and a plural of data structures for external storage region management are assigned to the created files and the data structures belonging to a certain storage management group may be assigned to such data structures for external storage region management.

The processing sequence to expand the storage region of DB data in the second embodiment is almost the same as the sequence in the first embodiment. However, since the storage management group is introduced, the second embodiment differs in such a point that the virtual data structure corresponds to a plurality of data structures belonging to the storage management group.

When the DBMS 88 uses the files provided by the file system in the OS 80, there are following differences further.

First, if it is impossible for the DBMS 88 to expand the region of the file even when it tries to do so the DBMS 88 can issue a region expanding process, a method of issuing a region expanding request to the system management server 72.

In the step 1120, the file system expanding process should be executed after completion of expansion of the virtual data structure.

In the step 1108, after a virtual data structure is newly created, the host 70 is notified to create a new file system on newly created virtual data structure.

In the step 1110, following processes are executed. When the file system has been expanded in the step 1120, it is notified to the DBMS 88 that existing file can be expanded. When a file system is newly created in the step 1108, a file is created for the created file system and an instruction is issued to the DBMS 88 to add the created file to the corresponding data structure for external storage region management.

<Third Embodiment>

In the third embodiment, different files are assigned for every data structure of DB such as table, index and log based on the schema of provided DB in the storage unit which is accessed on the basis of file. It is instructed to the DBMS to create a DB to store the data to the corresponding files. With the processes described above, the particular file holds only the data belonging to the particular data structure. The snapshot mirror function and remote mirroring function assigned to the data structure of DB are set using the file assignment described above.

Almost all portions of the third embodiment are identical to the first embodiment. Only difference between the third embodiment and first embodiment will be described below.

Figure 10:
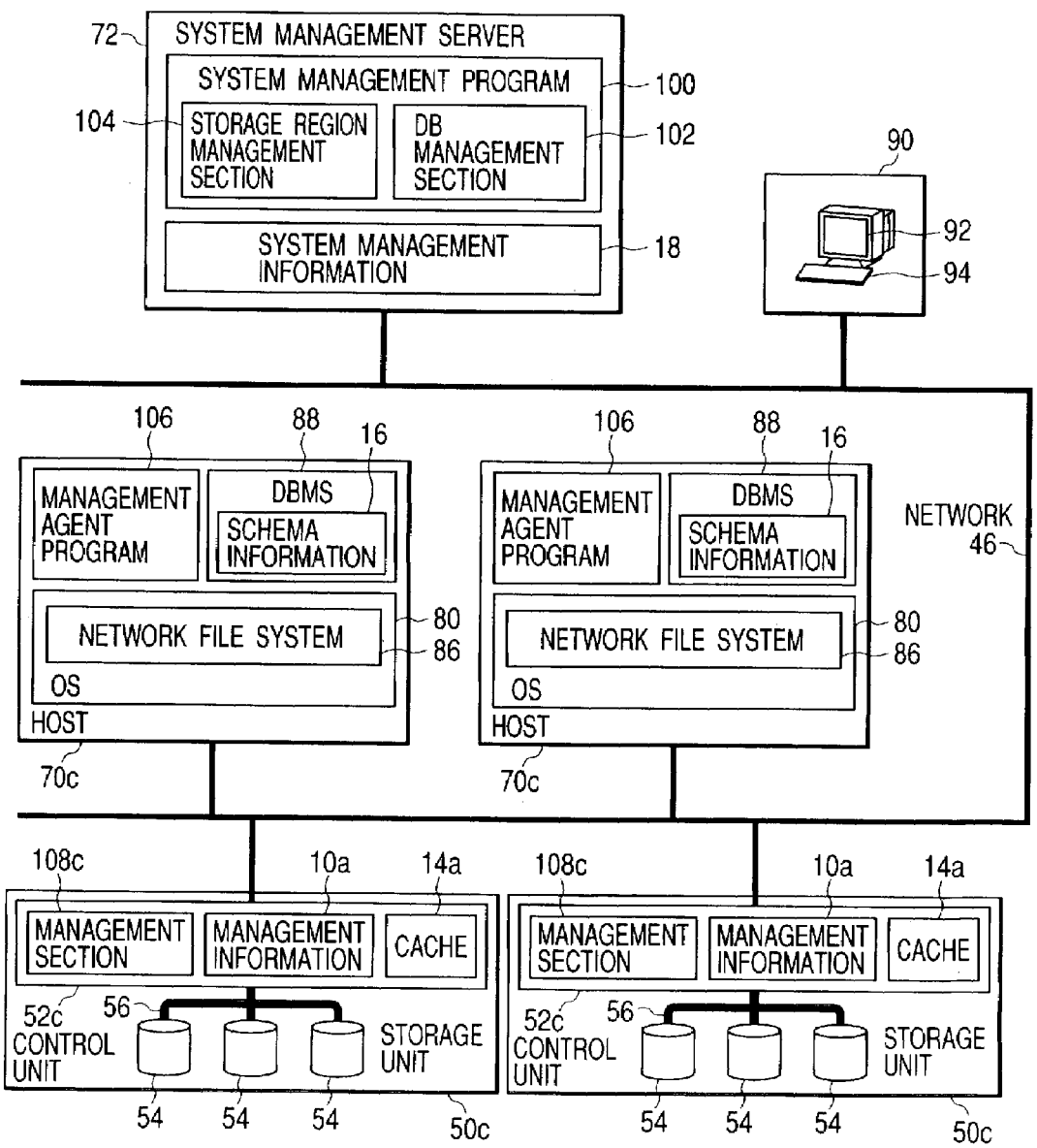
FIG. 10 illustrates a configuration of a computer system in a third embodiment.

FIG. 10 illustrates a configuration of the computer system in the third embodiment. This differs from that in the first embodiment in the following points.

The storage unit 50 is changed to a storage unit 50c which is accessed on the basis of file. Moreover, the host 70 is changed to a host 70c including a network file system 86. Since the data transfer between the host 70c and storage unit 50c is performed using the network 46, the I/O path 40 and virtualization switch 60 do not exist.

Since storage unit 50c is accessed on the basis of file, the control unit 52 is changed to a control unit 52c and the management section 108a existing in the control unit 52 is changed to a management section 108c.

The management section 108c controls, using the management information 10a, address conversion between the file and a physical storage region in the hard disk drive 54. Moreover, when the storage unit 50c has the remote mirroring function and snapshot mirror function for group of the files designated by the file and directory structure or the like, setting of functions is also stored in the management information 10a. In addition, the information about DB is also stored in the management information 10a, which is utilized for the prefetch control of data to the cache 14a and optimizing process of the storing location of data for the hard disk drive 54.

Moreover, the management section 108c dynamically changes the storing location in the hard disk drive 54 of the data belonging to the file depending on the instruction received from an external side via the network 46. The management section 108c of the storage unit 50c is not necessarily required to dynamically change the storing location of data. Further, the remote mirroring function and snapshot mirror function may be unsupported.

The host 70c includes a network file system 86 in the OS 80. The network file system 86 is a program for controlling access on the basis of file to the storage unit 50c.

The hierarchical configuration of the data mapping in the third embodiment is as follows. In the first embodiment, the logical volume 204, virtual volume 206 and logical unit 208 are provided as a virtual data structure. In the third embodiment, only the file provided by the storage unit 50c is processed as the virtual data structure. The DBMS 88 stores data of DB on the file via the network file system 86.

Other points are almost identical to the first embodiment. However, the virtual data structure is prepared only for the file provided by the storage unit 50c. Therefore, in this embodiment, setting of the remote mirroring function and snapshot mirror function, for example, must be done using a file group which is designated with file and directory or the like.

The method for realizing automatic region management in the computer system combining the DBMS, apparatus having the virtualization function and software; can be provided by the present invention.

A logical storage region such as virtual volume or the like can be created based on the schema of new DB and creation of DB is instructed to store the data of DB in such logical storage region. The information of functions to be set to the DB data such as the remote mirroring function and snapshot mirror function is administrated together with the schema of new DB. Necessary functions are set automatically to the created logical storage region based on the information about setting functions. Expansion of data storage region can also be executed automatically by utilizing the existing mapping.

In order to realize easier automatic region management a logical storage region holds the data of one data structure is stored, as a rule. However, a plurality of data structures may be processed as one group considering the restrictions on the setting of functions of the storage unit and other virtualization functions. In this case, plural data structures belonging to one group are stored in the same logical storage region.

Mapping information about a data structure is given to the apparatus having the virtualization function. As a result, each apparatus can realize the optimization of data prefetch to cache and data allocation by utilizing DB information.

<Effects of the Invention>

The present invention provides a method for remarkably realizing an automatic storage region management process of DB data. As a result, the region management process can be facilitated. Namely, management cost of storage region can be cut down.

Moreover, the present invention can improve performance of the computer system because the storage unit and virtualization apparatus can easily realize optimization of data allocation and data prefetching by using the DB information.

What is claimed is:

1. A computer system comprising:
   a computer to operate a database management system;
   a storage unit to store a database;
   a data transfer section which is connected between said computer and said storage unit to control data transfer between said computer and said storage unit and to provide a virtual volume by utilizing a storage region provided by said storage unit; and
   a system management server which obtains schema information when said database is created by management of system and issues an instruction to said database management system and said data transfer section to perform storage region management processing of said database based on said schema information.

2. A computer system according to claim 1, wherein said data transfer section is realized with a program executed by said computer.

3. A computer system according to claim 1, wherein said computer is identical to said system management server.

4. A computer system according to claim 1, wherein said system management server includes said data transfer section.

5. A system management server used in a computer system comprising:
   a computer to operate a database management system;
   a storage unit to store a database; and
   a data transfer section connected between said computer and said storage unit to control transfer of data between said computer and said storage unit and dynamically create and provide a virtual volume using a storage region provided by said storage unit whereby said system management server obtains schema information when said database is created by management of system and issues an instruction to said database management system and said data transfer section to perform storage region management processing of said database based on said schema information, and said system management server issues an instruction to said data transfer section to create said virtual volume as said storage region management process of database and also issues an instruction to said database management system to assign said virtual volume created for said database management system to a data structure for storage region management of said database.

6. A system management server used in a computer system comprising:

a computer to operate a database management system;

a storage unit to store a database; and a data transfer section connected between said computer and said storage unit to control transfer of data between said computer and said storage unit and dynamically create and provide a virtual volume using a storage region provided by said storage unit whereby said system management server obtains schema information when said database is created by management of system, and issues an instruction to said database management system and said data transfer section to perform storage region management processing of said database based on said schema information, and said system management server issues an instruction to said data transfer section to create said virtual volume as said storage region management process of database and also issues an instruction to said database management system to assign said virtual volume created for said database management system to a data structure for storage region management of said database, wherein said system management server issues an instruction to assign, when said database is created, said virtual volume created for said data structure for storage region management of database to said database management system together with the schema information of said database.

7. A system management server according to claim 6, wherein said system management server assigns the data of said database so that said virtual volume holds only a data structure of said database.

8. A system management server according to claim 6, wherein said data transfer section has a data mirroring function to create a mirror of data, and said system management server obtains mirroring function setting information to determine whether said data mirroring function should be used or not for data structures of said database and sets said data mirroring function to said virtual volume based on said mirroring function setting information after creation of said virtual volume is instructed to said data transfer section.

9. A system management server used for a computer system comprising;

a computer to operate a database management system;

a storage unit to store a database; and a data transfer section connected between said computer and said storage unit, having the functions for controlling transfer of data between said computer and said storage unit, dynamically providing a virtual volume using a storage region provided by said storage unit and dynamically expanding the storage region assigned to said virtual volume, whereby said system management server obtains schema information when the database is created by management of system and issues an instruction to said database management system and said data transfer section to perform storage region management processing of said database based on said schema information; and system management server issues an instruction to said data transfer section to expand the storage region of said virtual volume as said storage region management processing of said database.

10. A computer system comprising:

a computer to operate a database management system;

a storage unit connected to said computer and provided with a hard disk drive to provide a logical storage unit to said computer and a convert storing location in said logical unit used at a time of access to a storing location of said hard disk drive; and a system management server which obtains schema information when a database is created by management of system and issues an instruction to said database management system and said storage unit to perform storage region management processing of said database based on said schema information.

11. A computer system comprising:

a computer to operate a database management system;

a storage unit connected to said computer and provided with a hard disk drive to provide a logical storage unit to said computer and a convert storing location in said logical unit used at a time of access to a storing location of said hard disk drive; and a system management server which obtains schema information when a database is created by management of system and issues an instruction to said database management system and said storage unit to perform storage region management processing of said database based on said schema information, wherein said storage unit dynamically creates said logical storage unit and said system management server issues an instruction to said storage unit to create said logical storage unit as said storage region management processing of said database and also issues an instruction to said database management system to assign said created logical storage unit to data structure for storage region management of said database.

12. A computer system according to claim 11, wherein said system management server issues, when said database is created, an instruction to said database management system to assign said logical storage unit created in said data structure for storage region management of database together with said schema information of database.

13. A method of creation and management of virtual volume in a computer system comprising a computer to operate a database management system, a storage unit, a data transfer section connected between said computer and said storage unit to control transfer of data between said computer and said storage unit and a system management server for management of system, wherein said data transfer section provides a virtual volume using a storage region provided from said storage unit, wherein:

said system management server obtains, when a database is created, schema information thereof and issues an instruction of creation and management process of said virtual volume used for the storage region of said database to said data transfer section based on said schema information.

14. A method of creation and management of virtual volume in a computer system comprising a computer to operate a database management system, a storage unit, a data transfer section connected between said computer and said storage unit to control transfer of data between said computer and said storage unit and a system management server for management of system, wherein said data transfer section provides a virtual volume using a storage region provided from said storage unit, wherein:

said system management server obtains, when a database is created, schema information thereof and issues an instruction of creation and management process of said virtual volume used for the storage region of said database to said data transfer section based on said schema information, wherein functions of said data transfer section are realized with programs to be executed by said computer.

15. A method of creation and management of virtual volume according to claim 14, wherein said data transfer section has a function to dynamically create said virtual volume and said system management server issues an instruction to said data transfer section to create said virtual volume and also issues an instruction to said database management system to assign said created virtual volume to data structure of storage for region management of said database.

16. A method of creation and management of a logical storage unit in a computer system comprising a computer to operate a database management system, a storage unit connected to said computer and a system management server for management of system, wherein said storage unit includes a hard disk drive, provides a logical storage unit for said computer and converts a storing location of said logical storage unit used for access to a storing location of said hard disk drive, wherein;

said system management server obtains, when a database is created, the schema information thereof and issues an instruction to said storage unit to perform creation and management of said logical storage unit used for a storage region of said database based on said schema information.

17. A method of creation and management of a logical storage unit in a computer system comprising a computer to operate a database management system, a storage unit connected to said computer and a system management server for management of system, wherein said storage unit includes a hard disk drive, provides a logical storage unit for said computer and converts a storing location of said logical storage unit used for access to a storing location of said hard disk drive, wherein;

said system management server obtains, when a database is created, the schema information thereof and issues an instruction to said storage unit to perform creation and management of said logical storage unit used for a storage region of said database based on said schema information, wherein said storage unit has a function to dynamically create said logical storage unit and said system management server issues an instruction to said storage unit to create said logical storage unit and also issues an instruction to said database management system to assign said created logical storage unit to data structure for storage region management of said database together with said schema information of database.

18. A method of creation and management of logical storage unit according to claim 17, wherein said storage unit has a data mirroring function to create a mirror of data and said system management server obtains the mirroring function setting information to determine whether a data mirroring function should be used or not for data structures of said database and sets, after issuing an instruction to said storage unit to create said logical storage unit, said data mirroring function to said logical storage unit based on said mirroring function setting information.

19. A method of creation and management of file in a computer system comprising a computer to operate a database management system, a storage unit connected to said computer and a system management server for management of system, wherein said storage unit includes hard disk drives, has a data mirroring function to create a mirror of data, provides a storage region to said computer as a file and converts a storing location in said file used for access to a storing location of said hard disk drives, wherein said system management server obtains, when a database is created, schema information thereof, obtains a mirroring function setting information to determine whether the data mirroring function should be used or not for data structures of said database, and issues an instruction to said storage unit to perform said creation and management of files used for said storage region of database based on said schema information and said mirroring function setting information.

20. A computer system, comprising:

a computer configured to operate a database management system;

a storage unit including a plurality of storage devices, a storage controller to control access the storage devices by the computer, the storage devices being used to provide a database that is defined according to given schema information;

a data transfer section coupling said computer and said storage unit to control data transfer between said computer and said storage unit, the data transfer section configured to provide a virtual volume that is defined by one or more logical units, the one or more logical units being defined by one or more storage devices in the storage unit; and a system management server configured to receive a request to create a new database, the request including function information and schema information corresponding to the new database to be created, wherein the system management server is configured to issue instructions to said database management system of the computer and said data transfer section in response to the request, and wherein the instructions includes a first instruction to the data transfer section to create a new virtual volume according to the request and a second instruction to the database management system to create the new database, the new database being associated with the new virtual volume.

21. A computer system according to claim 20, wherein said data transfer section is realized with a program executed by said computer, said data transfer section being a virtualization switch.

22. A computer system according to claim 20, wherein said computer and said system management server are the same.

23. A computer system according to claim 20, wherein said system management server includes said data transfer section.

24. A system management server provided in a computer system,
   wherein the computer system includes:
      a computer to operate a database management system,
      a storage unit including a plurality of storage devices, a storage controller to control the storage devices, the storage devices being used to provide a database that is defined according to given schema information, and
      a virtualization switch coupling said computer and said storage unit to control transfer of data between said computer and said storage unit and dynamically create a virtual volume using the storage devices provided by said storage unit, the virtual volume being defined by one or more logical units, the one or more logical units being defined by the storage devices,
   wherein said system management server is configured to receive a request to define a new database, the request including schema information relating to the new database to be created,
   wherein the system management server is configured to issue, in response to the request, a first instruction to the virtualization switch to define a new virtual volume according to the request and a second instruction to the database management system to create the new database according to the schema information, the new database being associated with the new virtual volume.

25. A system management server according to claim 24, wherein said schema information relates to information needed to manage the new database and includes data structure definition and data location information.

26. A system management server according to claim 25, wherein said virtual volume is configured to be associated with only data structure of said new database.

27. A system management server according to claim 25, wherein the request to the system management server includes function information as well as the schema information, the function information relating to one or more database functions associated with the virtual volume, the one or more database functions including a data mirroring function.

28. A system management server according to claim 24, wherein said virtualization switch is configured to perform a data mirroring function to provide a mirror copy of data, wherein the system management server obtains mirroring function setting information to determine whether or not said data mirroring function should be used for the data structure of said new database, wherein the system management server causes said data mirroring function to be associated with said new virtual volume based on said mirroring function setting information once said new virtual volume has been defined by said virtualization switch.

29. A system management server provided in a computer system,
   wherein the computer system includes:
      a computer to operate a database management system,
      a storage unit including a plurality of storage devices, a storage controller to control access to the storage devices by the computer, the storage devices being used to provide one or more databases, and
      a virtualization switch coupling said computer and said storage unit to control transfer of data between said computer and said storage unit, the switch being configured to dynamically provide a virtual volume using a storage region provided by said storage unit and dynamically expand the storage region assigned to said virtual volume,
   wherein the system management server is configured to receive a request to create a new database, the request including schema information corresponding to the new database to be created,
   wherein the system manager server is configured to issue instructions to said database management system of the computer and said data transfer section in response to the request, the instructions including a first instruction to the virtualization switch to create a new virtual volume according to the request and a second instruction to the database management system to associate a data structure of the new database to the new virtual volume, and
   wherein the system manager server is configured to issue an instruction to said virtualization switch to expand a storage region assigned to the new virtual volume.

30. The system manager server of claim 29, wherein the request includes function information.

31. The system manager server of claim 30, wherein the function information relates to one or more database functions associated with the virtual volume, the one or more database functions including a data mirroring function.

32. The system manager server of claim 30, wherein the computer is a host computer including a volume manager that presents a logical volume to the database management system, the logical volume being defined by one or more virtual volume.

33. A method for operating a storage system including a host to operate a database management system, a storage unit, a virtualization switch, and a system management server, the storage unit including a plurality of storage devices, a storage controller to control access to the storage devices, the storage devices being used to provide one or more databases, the virtualization switch coupling said host and said storage unit and configured to control data transfer between said host and said storage unit, the virtualization switch being configured to provide a virtual volume that is defined by one or more logical units, the one or more logical units being defined by one or more storage devices in the storage unit, the method comprising:
   receiving a request to create a new database, the request including schema information on the new database to be created;
   issuing a first instruction to the virtualization switch to define a virtual volume according to the request; and
   issuing a second instruction to the host to create the new database, the new database being associated with the virtual volume defined by the virtualization switch.

34. A method of claim 33, further comprising;
   setting management information needed to create the new database according to the request;
   determining a configuration of the data structure associated with the database; and
   setting one or more database functions to the virtual volume defined by the virtualization switch.

35. A method for operating a storage system including a host to operate a database management system, a storage unit, a virtualization switch, and a system management server, the storage unit including a plurality of storage devices, a storage controller to control access to the storage devices, the storage devices being used to provide one or more databases, the virtualization switch coupling said host and said storage unit and configured to control data transfer between said host and said storage unit, the virtualization switch being configured to provide a virtual volume that is defined by one or more logical units, the one or more logical units being defined by one or more storage devices in the storage unit, the method comprising:

receiving a request to create a new database, the request including schema information on the new database to be created;

issuing a first instruction to the virtualization switch to define a virtual volume according to the request; and issuing a second instruction to the host to create the new database, the new database being associated with the virtual volume defined by the virtualization switch, wherein said virtualization switch is configured to dynamically create said new virtual volume, and said system management server is configured to issue an instruction to said virtualization switch to define the virtual volume and issue an instruction to said database management system to assign the virtual volume defined by the virtualization switch to data structure of said database.

36. A method of creation and management of a logical storage unit in a computer system comprising a computer to operate a database management system, a storage unit connected to said computer and a system management server for management of system, wherein said storage unit includes a hard disk drive that is used to provide a logical storage unit for said computer and converts a first storage address of said logical storage unit to a second storage address of said hard disk drive, the method comprising:

receiving a first request from a virtualization component to create a new logical unit as part of a virtual data structure to be defined, the virtual data structure comprising a logical unit mapped to the hard disk drive and a virtual volume mapped to the logical unit that is mapped to the hard disk drive; and creating the new logical unit according to schema information provided by the virtualization component, wherein one or more database functions are associated with the virtual data structure.

37. A method of creation and management of a logical storage unit in a computer system comprising a computer to operate a database management system, a storage unit connected to said computer and a system management server for management of system, wherein said storage unit includes a hard disk drive that is used to provide a logical storage unit for said computer and converts a first storage address of said logical storage unit to a second storage address of said hard disk drive, the method comprising:

receiving a first request from a virtualization component to create a new logical unit as part of a virtual data structure to be defined, the virtual data structure comprising a logical unit mapped to the hard disk drive and a virtual volume mapped to the logical unit that is mapped to the hard disk drive; and creating the new logical unit according to schema information provided by the virtualization component, wherein one or more database functions are associated with the virtual data structure, wherein said storage unit is configured to dynamically create said logical storage unit, wherein said the virtualization component couples the storage unit and the computer to control a data transfer between the storage unit and the computer.

38. A method of creation and management of logical storage unit according to claim 37, wherein said storage unit has a data mirroring function, the method comprising associating the data mirroring function to the new logical unit by the storage unit.

* * * * *